United States Patent
Chaya

(10) Patent No.: US 11,780,267 B2
(45) Date of Patent: Oct. 10, 2023

(54) PNEUMATIC TIRE

(71) Applicant: The Yokohama Rubber Co., LTD., Tokyo (JP)

(72) Inventor: Takamitsu Chaya, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 17/310,975

(22) PCT Filed: Mar. 6, 2020

(86) PCT No.: PCT/JP2020/009794
§ 371 (c)(1),
(2) Date: Sep. 2, 2021

(87) PCT Pub. No.: WO2020/179920
PCT Pub. Date: Sep. 10, 2020

(65) Prior Publication Data
US 2022/0041018 A1    Feb. 10, 2022

(30) Foreign Application Priority Data
Mar. 7, 2019   (JP) .................................. 2019-041746

(51) Int. Cl.
*B60C 9/02*   (2006.01)
*B60C 9/08*   (2006.01)
(Continued)

(52) U.S. Cl.
CPC .............. *B60C 9/08* (2013.01); *B60C 1/0041* (2013.01); *C08L 67/02* (2013.01); *B60C 2009/045* (2013.01); *B60C 2009/0466* (2013.01)

(58) Field of Classification Search
CPC ......... B60C 9/04; B60C 9/045; B60C 9/0458; B60C 9/0466; B60C 2009/0416;
(Continued)

(56) References Cited

U.S. PATENT DOCUMENTS

2001/0050129 A1* 12/2001 Ohara ..................... B60C 15/06
152/547
2009/0139627 A1* 6/2009 Takahashi ................ D02G 3/48
152/527
(Continued)

FOREIGN PATENT DOCUMENTS

JP    11-170807 A    6/1999
JP    2002-2214 A    1/2002
(Continued)

*Primary Examiner* — Cedrick S Williams
(74) *Attorney, Agent, or Firm* — THORPE NORTH & WESTERN

(57) ABSTRACT

In a pneumatic tire, at least one carcass layer mounted between a pair of bead portions is formed from a carcass cord formed of an organic fiber cord having filament bundles of organic fibers intertwined together, a fineness based on corrected mass of the carcass cord is from 4000 dtex to 8000 dtex, an intermediate elongation of the carcass cord at a sidewall portion under 1.0 cN/dtex load is from 3.3% to 4.2%, and a ratio G/R of an interlayer rubber gauge G between a body portion and a folded back portion to a cord diameter R of the carcass cord, at a contact region where the body portion and the folded back portion are in contact in the carcass layer, is from 0.50 to 0.60.

6 Claims, 2 Drawing Sheets

(51) Int. Cl.
*B60C 1/00* (2006.01)
*C08L 67/02* (2006.01)
*B60C 9/04* (2006.01)

(58) Field of Classification Search
CPC .... B60C 2009/0425; B60C 2009/0458; B60C 2009/0475
See application file for complete search history.

(56) References Cited

U.S. PATENT DOCUMENTS

| | | | | |
|---|---|---|---|---|
| 2015/0020944 | A1* | 1/2015 | Till | B60C 9/08 152/542 |
| 2015/0129101 | A1* | 5/2015 | Koide | D01F 2/02 152/556 |
| 2018/0154695 | A1* | 6/2018 | Takenaka | B60C 9/02 |

FOREIGN PATENT DOCUMENTS

| | | | | | |
|---|---|---|---|---|---|
| JP | 2004-322782 | A | | 11/2004 | |
| JP | 2007-230405 | A | | 9/2007 | |
| JP | 2009-179105 | A | | 8/2009 | |
| JP | 2012030737 | A | * | 2/2012 | |
| JP | 2015-189252 | A | | 11/2015 | |
| JP | 2015231773 | A | * | 12/2015 | |
| JP | 6004045 | B1 | * | 10/2016 | B60C 9/0042 |
| JP | 2016-222010 | A | | 12/2016 | |
| JP | 2017043671 | A | * | 3/2017 | |
| JP | 2018-70064 | A | | 5/2018 | |

* cited by examiner

PNEUMATIC TIRE

TECHNICAL FIELD

The present technology relates to a pneumatic tire provided with a carcass layer formed of organic fiber cords and particularly relates to a pneumatic tire that enables both steering stability and high-speed durability.

BACKGROUND ART

A pneumatic tire typically includes a carcass layer mounted between a pair of bead portions. Rayon fiber cords are preferably used as the carcass cords forming such a carcass layer, particularly in high-performance tires. In this respect, from the perspective of making a pneumatic tire lighter in weight, for example, it has been proposed to use polyethylene terephthalate fiber cords (hereinafter referred to as PET fiber cords) that have high strength and are inexpensive compared with rayon fiber cords (for example, see Japan Unexamined Patent Publication No. 2015-189252).

In such a pneumatic tire in which polyester fiber cords are used in a carcass layer, in order to further improve steering stability, it has been attempted to increase the fineness of the carcass cords to achieve a higher rigidity in the carcass cords (in particular, a higher rigidity in the sidewall portion). However, since carcass cords having an increased fineness and a high rigidity generate much heat, a significant increase in the temperature in the sidewall portion (in particular, the region where the body portion and the folded back portion of the carcass layer are in contact) occurs, and there is a risk that the adhesiveness between the body portion and the folded back portion of the carcass layer will decrease when traveling at high speeds, and separation may occur. Accordingly, in a pneumatic tire provided with a carcass layer formed of organic fiber cords, there is a demand for measures to achieve a high level of both steering stability and high-speed durability.

SUMMARY

The present technology is to provide a pneumatic tire provided with a carcass layer formed of organic fiber cords, which enables both steering stability and high-speed durability.

A pneumatic tire according to an embodiment of the present technology includes a tread portion extending in a tire circumferential direction and having an annular shape, a pair of sidewall portions respectively disposed on both sides of the tread portion, and a pair of bead portions each disposed on an inner side of the pair of sidewall portions in a tire radial direction, the pneumatic tire including at least one carcass layer mounted between the pair of bead portions, the carcass layer being formed from a carcass cord formed of an organic fiber cord having filament bundles of organic fibers intertwined together, a fineness of the carcass cord after dip treatment being from 4000 dtex to 8000 dtex, and an intermediate elongation of the carcass cord at the sidewall portion under 1.0 cN/dtex load being from 3.3% to 4.2%, and the carcass layer being formed from a body portion extending from the tread portion through each sidewall portion to a corresponding bead portion and a folded back portion folded back at each bead portion and extending toward a corresponding sidewall portion side, and having a contact region at the sidewall portion where the body portion and the folded back portion are in contact, and a ratio G/R of an interlayer rubber gauge G between a carcass cord within the body portion and a carcass cord within the folded back portion at the contact region to a cord diameter R of the carcass cord being from 0.50 to 0.60.

According to an embodiment of the present technology, as described above, the fineness of the carcass cord forming the carcass layer after dip treatment is from 4000 dtex to 8000 dtex, and the intermediate elongation of the carcass cord at the sidewall portion under 1.0 cN/dtex load is from 3.3% to 4.2%, and thus the rigidity in the sidewall portion is increased and steering stability can be improved. On the other hand, since the ratio G/R described above is set to be in the range of from 0.50 to 0.60, and the interlayer rubber gauge G between a carcass cord within the body portion and a carcass cord within the folded back portion at the contact region is ensured to be appropriately large with respect to the cord diameter R of the carcass cord, a temperature increase and shear strain in the body portion and the folded back portion of the carcass layer at the contact region are suppressed and high-speed durability can be improved. Due to these measures, the pneumatic tire according to an embodiment of the present technology can achieve a high level of both steering stability and high-speed durability.

According to an embodiment of the present technology, a twist coefficient K of the carcass cord after dip treatment represented by Formula (1) below is preferably 2000 or more. By having such a large twist coefficient K, durability against fatigue due to repeated compressive deformation of the turned up portion of the carcass layer caused by the flexing of the bead portion when the tire is rolling can be ensured.

$$K = T \times D^{1/2} \quad (1)$$

(where T is an upper twist count of cord (counts/10 cm), and D is the total fineness of cord (dtex))

According to an embodiment of the present technology, an organic fiber forming the carcass cord is preferably a polyethylene terephthalate fiber. In this way, the physical properties of the carcass cord are further improved, which is advantageous in achieving a high level of both steering stability and high-speed durability.

According to an embodiment of the present technology, the fineness of the carcass cord after dip treatment is preferably from 5000 dtex to 7000 dtex. Also, an intermediate elongation of the carcass cord at the sidewall portion under 1.0 cN/dtex load is preferably from 3.5% to 4.0%. Further, a twist coefficient K of the carcass cord after dip treatment is preferably from 2100 dtex to 2500 dtex. By determining each physical property value in this manner, the physical properties of the carcass cord are further improved, which is advantageous for achieving a high level of both steering stability and high-speed durability.

DETAILED DESCRIPTION

Configurations of embodiments of the present technology will be described in detail below with reference to the accompanying drawings.

Figure 1:
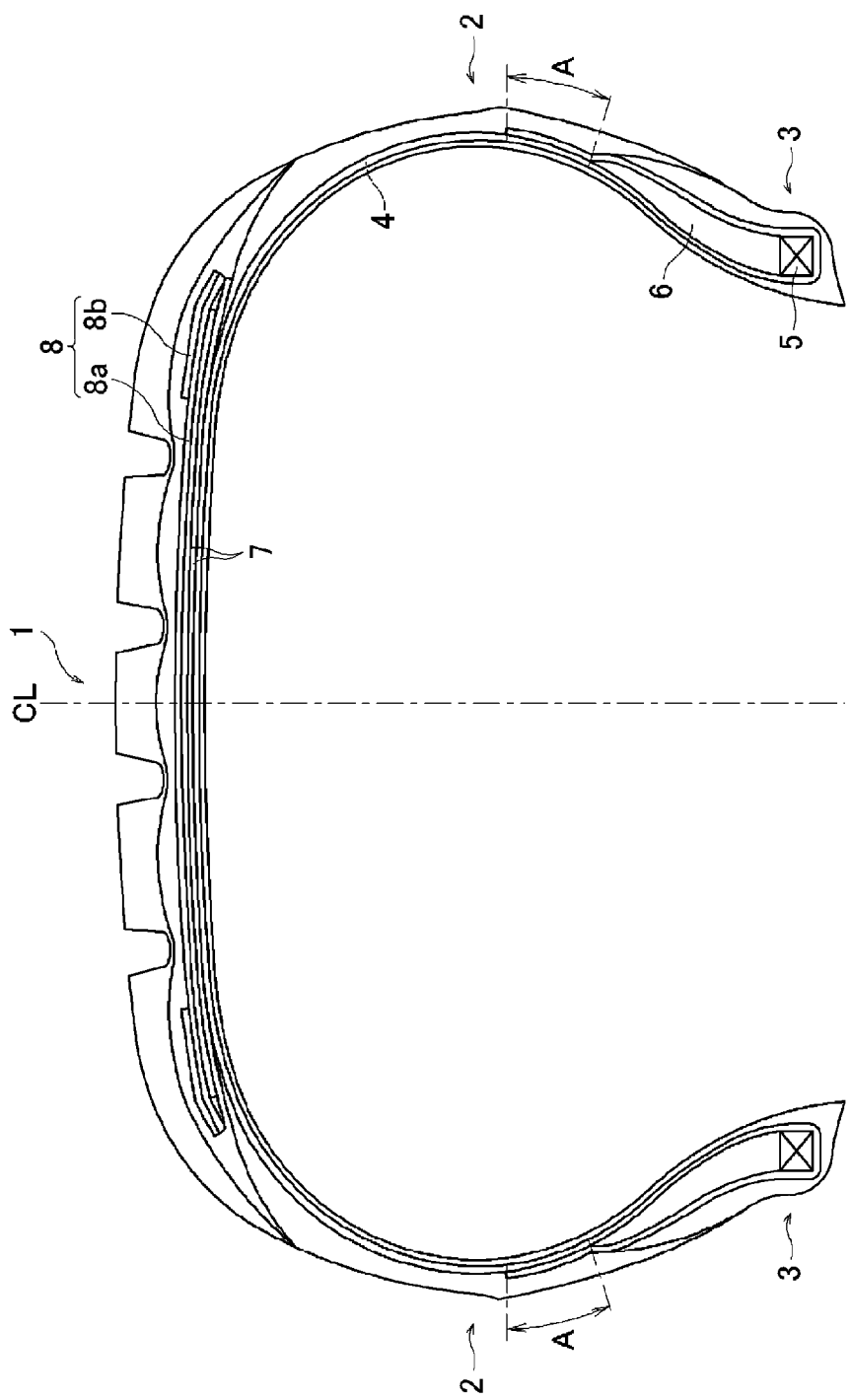
FIG. 1 is a meridian cross-sectional view illustrating a pneumatic radial tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. Note that "CL" in FIG. 1 denotes a tire equator. Although not illustrated in FIG. 1 as FIG. 1 is a meridian cross-sectional view, the tread portion 1, the sidewall portions 2, and the bead portions 3 each extend in a tire circumferential direction to form an annular shape. Thus, a toroidal basic structure of the pneumatic tire is configured. Although the description using FIG. 1 is basically based on the illustrated meridian cross-sectional shape, all of the tire components each extend in the tire circumferential direction and form the annular shape.

In the illustrated example, a plurality of main grooves (four main grooves in the illustrated example) extending in the tire circumferential direction are formed in the outer surface of the tread portion 1; however, the number of main grooves is not particularly limited. Further, in addition to the main grooves, various grooves and sipes that include lug grooves extending in a tire width direction can be formed.

A carcass layer 4 including a plurality of reinforcing cords (carcass cords 4c) extending in the tire radial direction are mounted between the pair of left and right bead portions 3. A bead core 5 is embedded within each of the bead portions, and a bead filler 6 having a triangular cross-sectional shape is disposed on the outer periphery of the bead core 5. The carcass layer 4 is folded back around the bead core 5 from an inner side to an outer side in the tire width direction. Accordingly, the bead core 5 and the bead filler 6 are wrapped by a body portion 4A (a portion extending from the tread portion 1 through each of the sidewall portions 2 to a corresponding one of the bead portions 3) and a folded back portion 4B (a portion folded back around the bead core 5 of each bead portion 3 to extend toward a corresponding one of the sidewall portions 2) of the carcass layer 4.

A plurality (in the illustrated example, two layers) of belt layers 7 are embedded on an outer circumferential side of the carcass layer 4 in the tread portion 1. The belt layers 7 each include a plurality of reinforcing cords (belt cords) inclined with respect to the tire circumferential direction, and are disposed such that the belt cords of the different layers intersect each other. In these belt layers 7, the inclination angle of the belt cords with respect to the tire circumferential direction is set in a range of, for example, 10° or more and 40° or less. Steel cords are used as the belt cords, for example.

A belt cover layer 8 is provided on an outer circumferential side of the belt layer 7 for the purpose of improving high-speed durability and reducing road noise. The belt reinforcing layer 8 includes reinforcing cords (belt reinforcing cords) oriented in the tire circumferential direction. In the belt reinforcing layer 8, the angle of the belt reinforcing cords with respect to the tire circumferential direction is set, for example, to from 0° to 5°. Organic fiber cords (for example, PET fiber cords) are used as the belt reinforcing cords. In an embodiment of the present technology, the belt cover layer 8 necessarily includes a full cover layer 8a that covers the entire region of the belt layers 7, and can be configured to include a pair of edge cover layers 8b that locally cover both end portions of the belt layers 7 as necessary (in the illustrated example, the belt cover layer includes both the full cover layer 8a and the edge cover layers 8b). The belt cover layer 8 is preferably configured such that a strip material made of at least a single belt reinforcing cord bunched and covered with coating rubber is wound helically in the tire circumferential direction, and desirably has, in particular, a jointless structure.

The present technology relates to the carcass cord forming the carcass layer 4 described above, and thus the basic structure of the entire tire is not limited to that described above.

According to an embodiment of the present technology, the carcass cord 4c forming the carcass layer 4 is formed of an organic fiber cord having filament bundles of organic fibers intertwined together. The fineness of the carcass cord 4c (organic fiber cord) after dip treatment is from 4000 dtex to 8000 dtex, and preferably from 5000 dtex to 7000 dtex. Also, the intermediate elongation of the carcass cord 4c at the sidewall portion 2 under 1.0 cN/dtex load is from 3.3% to 4.2%, and preferably from 3.5% to 4.0%. The type of organic fibers constituting the carcass cords 4c is not particularly limited, and for example, polyester fibers, nylon fibers, aramid fibers, or the like can be used, with polyester fibers being particularly suitable. Additionally, examples of the polyester fibers include polyethylene terephthalate fibers (PET fibers), polyethylene naphthalate fibers (PEN fibers), polybutylene terephthalate fibers (PBT), and polybutylene naphthalate fibers (PBN), with PET fibers being particularly suitable. Note that "fineness after dip treatment" is a fineness measured after performing dip treatment on the carcass cord 4c (organic fiber cord), and is not a value of the carcass cord 4c (organic fiber cord) itself, but rather a value of that also including dip liquid adhered to the carcass cord 4c (organic fiber cord) after dip treatment. Additionally, "intermediate elongation under 1.0 cN/dtex load" is the elongation ratio (%) of sample cords, which is measured under 1.0 cN/dtex load by conducting a tensile test in accordance with JIS (Japanese Industrial Standard)-L1017 "test methods for chemical fiber tire cords" and under the conditions that the gripping interval is 250 mm and the tensile speed is 300±20 mm/minute, for carcass cords 4c (sample cords) extracted from the sidewall portion 2 of the pneumatic tire.

Figure 2:
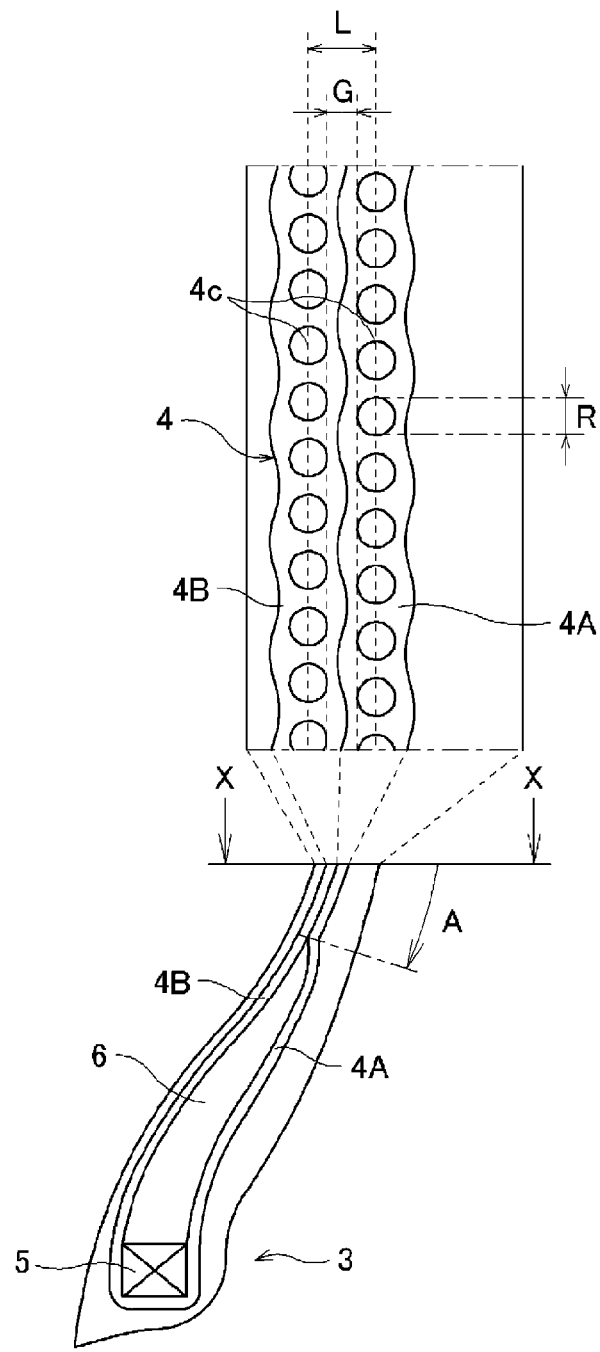
FIG. 2 is a schematic view illustrating an interlayer rubber gauge G by combining a meridian cross-sectional view of a portion of the pneumatic radial tire according to an embodiment of the present technology and a cross-sectional view taken along line X-X in FIG. 2.

Also, since the carcass layer 4 is formed from the body portion 4A and the folded back portion 4B as described above, the carcass layer 4 has a contact region A at the sidewall portion 2 where the body portion 4A and the folded back portion 4B are in contact. The range of the contact region A is not particularly limited and can be, for example, in a range of from 2 mm to 15 mm from the outer edge of the bead filler 6 in the tire radial direction toward the outer side in the tire radial direction. As illustrated in FIG. 2, in the contact region A, when the sidewall portion 2 is cut along the tire circumferential direction and an interlayer rubber gauge G is a distance between a carcass cord 4c included in the body portion 4A and a carcass cord 4c included in the folded back portion 4B, a ratio G/R of the interlayer rubber gauge G to a cord diameter R of the carcass cord 4c is from 0.50 to 0.60, and preferably from 0.52 to 0.58. Note that in a cross section where the sidewall portion 2 is cut along the tire circumferential direction, variation may occur in the carcass cords 4c, and thus the interlayer rubber gauge G is obtained, as illustrated in FIG. 2, by drawing an approximate straight line through the centers of the plurality of carcass cords 4c included in the body portion 4A and an approximate straight line through the centers of the plurality of carcass cords 4c included in the folded back portion 4B so as to be parallel with each other, and subtracting the cord diameter R of the carcass cord 4c from the distance L between the approximate straight lines.

In this manner, by using the organic fiber cord having specific physical properties in the carcass layer 4 and setting the interlayer rubber gauge G at the contact region with respect to the cord diameter R as described above, the pneumatic tire according to an embodiment of the present technology can achieve a high level of both steering stability and high-speed durability. In other words, by the carcass layer 4 (organic fiber cord) having the physical properties described above, the rigidity in the sidewall portion 2 can be increased, and steering stability can be improved. On the other hand, the interlayer rubber gauge G at the contact region A is ensured to be appropriately large with respect to the cord diameter R of the carcass cord 4c, and thus temperature increase and shear strain in the body portion 4A and the folded back portion 4B of the carcass layer 4 at the contact region A is suppressed and high-speed durability can be improved.

In this situation, when the fineness of the carcass cord 4c after dip treatment is less than 4000 dtex, the carcass cord 4c will be too narrow and its rigidity cannot be sufficiently ensured, and thus the effect of improving steering stability cannot be obtained. When the fineness of the carcass cord 4c after dip treatment is greater than 8000 dtex, heat generation caused by the carcass cords 4c cannot be suppressed, and high-speed durability will decrease. When the intermediate elongation described above is less than 3.3%, the rigidity of the sidewall portion 2 becomes excessive, and high-speed durability will decrease. When the intermediate elongation described above is greater than 4.2%, the rigidity of the sidewall portion 2 cannot be sufficiently ensured, and the effect of improving steering stability cannot be obtained. When the ratio G/R described above is less than 0.50, the interlayer rubber gauge is excessively small, and thus the temperature increase and shear strain between the body portion 4A and the folded back portion 4B of the carcass layer 4 cannot be sufficiently suppressed, and high-speed durability will decrease. When the ratio G/R described above is greater than 0.60, the rigidity of the sidewall portion 2 becomes excessive, and the high-speed durability will decrease.

In addition to the physical properties described above, in the carcass cord 4c according to an embodiment of the present technology, the twist coefficient K represented by the Formula (1) below is preferably 2000 or more, and more preferably from 2100 to 2500. Note that the twist coefficient K is a value of the carcass cord 4c after dip treatment. Setting the twist coefficient K to be large in this manner is advantageous in improving high-speed durability. When the twist coefficient K is less than 2000, repeated compressive deformation of the turned up portion of the carcass layer 4 caused by flexing of the bead portion when the tire is rolling may cause fatigue to occur in the carcass layer 4, and there is a risk that the effect of improving high-speed durability will not be sufficiently obtained.

$$K = T \times D^{1/2} \quad (1)$$

(where T is an upper twist count of cord (counts/10 cm), and D is the total fineness of cord (dtex))

Examples

Pneumatic tires according to Conventional Example 1, Comparative Examples 1 to 5 and Examples 1 to 7 were manufactured. The tires have a tire size of 255/35R19 and include a basic structure illustrated in FIG. 1. The tires are different in terms of the fineness of the carcass cord after dip treatment, the intermediate elongation of the carcass cord at the sidewall portion under 1.0 cN/dtex load, the ratio G/R of the interlayer rubber gauge G between a carcass cord within the body portion and a carcass cord within the folded back portion at a contact region to a cord diameter R of the carcass cord, and a twist coefficient K as indicated in Tables 1 and 2.

Note that in all examples, the rubber gauge G was measured in a cross section in which the sidewall portion was cut in the tire circumferential direction at a position 5 mm on the outer side in the tire radial direction from the outer edge of the bead filler in the radial direction. Also, in all examples, polyethylene terephthalate fibers (PET fibers) were used as the organic fibers forming the carcass cord.

These test tires were evaluated for steering stability, high-speed durability, and presence of separation according to the following evaluation methods. The results are shown in Tables 1 and 2.

Steering Stability

The test tires were assembled on wheels having a rim size of 19×9.0 J, mounted on a test vehicle (four-wheel drive having an engine displacement of 2000 cc), set to be inflated to an air pressure of 240 kPa, and loaded with a load equivalent to two passengers. Under a condition of a speed of 110 km/h, sensory evaluations for steering stability were made by three test drivers on a test course formed of a paved road. The evaluation results were each scored by a 5-point method with the results of Conventional Example 1 being assigned 3 points (reference), and an average value of the scores of the three test drivers was indicated. Larger scores indicate superior steering stability performance at high speeds.

High-Speed Durability

The test tires were mounted on wheels having a rim size of 19×9.0 J, inflated with oxygen to an internal pressure of 240 kPa, and held for 30 days in a chamber maintained at a chamber temperature of 70° C. and a humidity of 95%. The pre-treated test tires in this manner were mounted on a drum testing machine with a drum with a smooth steel surface and a diameter of 1707 mm, and the ambient temperature was controlled to 38±3° C., the speed was increased from 120 km/h in increments of 10 km/h every 30 minutes, and the running distance until failure occurred in the tire was measured. Evaluation results are expressed as measurement values with Conventional Example 1 being assigned the index value of 100. Larger index values indicate superior high-speed durability.

Presence of Separation

After the tests of high-speed durability described above were performed, each test tire was disassembled and the presence of separation at the turned up end portion of the carcass layer was confirmed. The evaluation results were labeled "Yes" if separation occurred and "No" if no separation occurred.

TABLE 1-1

|  | Conventional Example 1 | Comparative Example 1 | Comparative Example 2 |
|---|---|---|---|
| Fineness after dip treatment dtex | 3900 | 3900 | 6400 |
| Intermediate elongation at sidewall portion under % 1.0 cN/dtex load | 2.9 | 3.7 | 3.0 |
| Ratio G/R | 0.41 | 0.55 | 0.55 |
| Twist coefficient K | 2200 | 2200 | 2200 |
| Steering stability | 3.0 | 2.5 | 3.5 |
| High-speed durability Index value | 100 | 103 | 87 |
| Presence of separation | No | No | Yes |

TABLE 1-2

|  | Example 1 | Example 2 | Example 3 | Comparative Example 3 |
|---|---|---|---|---|
| Fineness after dip treatment dtex | 6400 | 6400 | 6400 | 6400 |
| Intermediate elongation at sidewall portion under % 1.0 cN/dtex load | 3.3 | 3.7 | 4.2 | 4.6 |
| Ratio G/R | 0.55 | 0.55 | 0.55 | 0.55 |
| Twist coefficient K | 2200 | 2200 | 2200 | 2200 |
| Steering stability | 3.3 | 3.3 | 3.2 | 2.7 |
| High-speed durability Index value | 103 | 105 | 106 | 108 |
| Presence of separation | No | No | No | No |

TABLE 2-1

|  | Comparative Example 4 | Example 4 | Example 5 |
|---|---|---|---|
| Fineness after dip treatment dtex | 6400 | 6400 | 6400 |
| Intermediate elongation at sidewall % portion under 1.0 cN/dtex load | 3.7 | 3.7 | 3.7 |
| Ratio G/R | 0.43 | 0.50 | 0.60 |
| Twist coefficient K | 2200 | 2200 | 2200 |
| Steering stability Index | 3.4 | 3.3 | 3.2 |
| High-speed durability value | 85 | 102 | 105 |
| Presence of separation | Yes | No | No |

TABLE 2-2

|  | Comparative Example 5 | Example 6 | Example 7 |
|---|---|---|---|
| Fineness after dip treatment dtex | 6400 | 6400 | 6400 |
| Intermediate elongation at sidewall % portion under 1.0 cN/dtex load | 3.7 | 3.7 | 3.7 |
| Ratio G/R | 0.64 | 0.55 | 0.55 |
| Twist coefficient K | 2200 | 1800 | 2000 |
| Steering stability | 2.6 | 3.3 | 3.3 |
| High-speed durability Index value | 107 | 95 | 100 |
| Presence of separation | No | No | No |

As can be seen from Tables 1 and 2, in contrast to the reference Conventional Example 1, the tires of Examples 1 to 7 achieved a high level of both steering stability and high-speed durability. Furthermore, no separation occurred even after the tests of high-speed durability. On the other hand, in Comparative Example 1, the fineness of the carcass cord after dip treatment was small, and thus steering stability decreased. In Comparative Example 2, the intermediate elongation of the carcass cord at the sidewall portion under 1.0 cN/dtex load was small, and thus high-speed durability deteriorated, and separation occurred in tires after high-speed durability testing. In Comparative Example 3, the intermediate elongation of the carcass cord at the sidewall portion under 1.0 cN/dtex load was large, and thus the steering stability decreased. In Comparative Example 4, the ratio G/R was small, and thus high-speed durability deteriorated, and separation occurred in tires after high-speed durability testing. In Comparative Example 5, the ratio G/R was large, and thus steering stability decreased.

The invention claimed is:

1. A pneumatic tire, comprising:
   a tread portion extending in a tire circumferential direction and having an annular shape;
   a pair of sidewall portions respectively disposed on both sides of the tread portion; and
   a pair of bead portions each disposed on an inner side of the pair of sidewall portions in a tire radial direction;
   the pneumatic tire comprising at least one carcass layer mounted between the pair of bead portions;
   the carcass layer being formed from a carcass cord formed of an organic fiber cord having filament bundles of organic fibers intertwined together, a fineness of the carcass cord after dip treatment being from 6000 dtex to 8000 dtex, an intermediate elongation of the carcass cord at the sidewall portion under 1.0 cN/dtex load being from 3.3% to 4.2%, and the organic fibers forming the carcass cord being a uniform material; and
   the carcass layer being formed from a body portion extending from the tread portion through each sidewall portion to a corresponding bead portion and a folded back portion folded back at each bead portion and extending toward a corresponding sidewall portion side, and having a contact region at the sidewall portion where the body portion and the folded back portion are in contact, and a ratio G/R of an interlayer rubber gauge G between a carcass cord within the body portion and a carcass cord within the folded back portion at the contact region to a cord diameter R of the carcass cord being from 0.50 to 0.60; wherein
   a twist coefficient K of the carcass cord after dip treatment represented by Formula (1) is from 2300 to 2500:

$$K = T \times D^{1/2} \tag{1}$$

where T is an upper twist count of cord (counts/10 cm), and D is a total fineness of cord (dtex).

2. The pneumatic tire according to claim 1, wherein the intermediate elongation of the carcass cord at the sidewall portion under 1.0 cN/dtex load is from 3.5% to 4.0%.

3. The pneumatic tire according to claim 1, wherein an organic fiber forming the carcass cord is a polyethylene terephthalate fiber.

4. The pneumatic tire according to claim 3, wherein the fineness of the carcass cord after dip treatment is from 6000 dtex to 7000 dtex.

5. The pneumatic tire according to claim 1, wherein the fineness of the carcass cord after dip treatment is from 6000 dtex to 7000 dtex.

6. The pneumatic tire according to claim 5, wherein the intermediate elongation of the carcass cord at the sidewall portion under 1.0 cN/dtex load is from 3.5% to 4.0%.

* * * * *